(12) United States Patent
Chittaro et al.

(10) Patent No.: US 12,166,828 B2
(45) Date of Patent: Dec. 10, 2024

(54) PEER CONNECTION MONITORING OF NETWORK APPLICATIONS

(71) Applicant: Interset Software, Inc., Santa Clara, CA (US)

(72) Inventors: Ron Chittaro, Ottawa (CA); Eric Rosenquist, Ottawa (CA); Kevin Goodman, Ottawa (CA)

(73) Assignee: Interset Software Inc., Santa Clara, CA (US)

( * ) Notice: Subject to any disclaimer, the term of this patent is extended or adjusted under 35 U.S.C. 154(b) by 0 days.

(21) Appl. No.: 16/217,695

(22) Filed: Dec. 12, 2018

(65) Prior Publication Data

US 2019/0182337 A1 Jun. 13, 2019

Related U.S. Application Data

(60) Provisional application No. 62/597,589, filed on Dec. 12, 2017.

(51) Int. Cl.
*H04L 67/146* (2022.01)
*H04L 9/40* (2022.01)
*H04L 67/104* (2022.01)

(52) U.S. Cl.
CPC ........ *H04L 67/146* (2013.01); *H04L 63/1416* (2013.01); *H04L 67/104* (2013.01)

(58) Field of Classification Search
CPC .. H04L 67/146; H04L 63/1416; H04L 67/104

USPC ................................. 709/223–224, 227–229
See application file for complete search history.

(56) References Cited

U.S. PATENT DOCUMENTS

| | | | |
|---|---|---|---|
| 11,410,659 B1* | 8/2022 | Singh | G10L 15/30 |
| 2005/0015496 A1* | 1/2005 | Guo | H04W 36/0011 709/227 |
| 2007/0240207 A1* | 10/2007 | Belakhdar | G06F 21/552 726/12 |
| 2015/0067182 A1* | 3/2015 | Droux | H04L 41/5096 709/228 |
| 2016/0065531 A1* | 3/2016 | Xiaopu | H04L 45/74 709/238 |
| 2017/0048899 A1* | 2/2017 | Li | H04W 76/11 |
| 2017/0201531 A1* | 7/2017 | Kim | H04W 12/0027 |
| 2017/0289263 A1* | 10/2017 | Lampert | H04L 51/046 |

* cited by examiner

*Primary Examiner* — Michael A Keller

(74) *Attorney, Agent, or Firm* — Sheridan Ross P.C.

(57) ABSTRACT

Host end points of a network connection can generate unique connection identifiers that are the same for both ends of the network connection. Both end points of the connection can send the connection identifiers in association with host end point metadata about the connection to a central location, where the metadata of both end points of a connection can be identified by the unique connection identifier.

20 Claims, 3 Drawing Sheets

PEER CONNECTION MONITORING OF NETWORK APPLICATIONS

CROSS-REFERENCE TO RELATED APPLICATIONS

The present application claims priority from United States Provisional Patent Application No. 62/597,589 filed Dec. 12, 2017, the entirety of which are hereby incorporated by reference for all purposes.

TECHNICAL FIELD

The current disclosure relates to monitoring network activity and in particular to monitoring peer connections of network applications.

BACKGROUND

Existing network security solutions like Intrusion Prevention/Detection Systems (IPS/IDS) products mainly work on the perimeter of the network and are focused on inbound traffic. These systems are pattern/signature based and thus are limited to detecting known public software or attacks that have been identified as malicious. They do not address a malicious insider attempting to steal information nor can they help with the attacks that do not use known malicious software such as viruses.

Similarly, antivirus scanners only work on known bad application signatures and cannot provide visibility into network activity let alone network peers. Current antivirus products can only detect known viruses and will not protect against a malicious insider or an already compromised system that is under control by an adversary who is using built-in tools in attempt to steal data.

It would be beneficial to be able to detect abnormal behavior for users and network applications.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
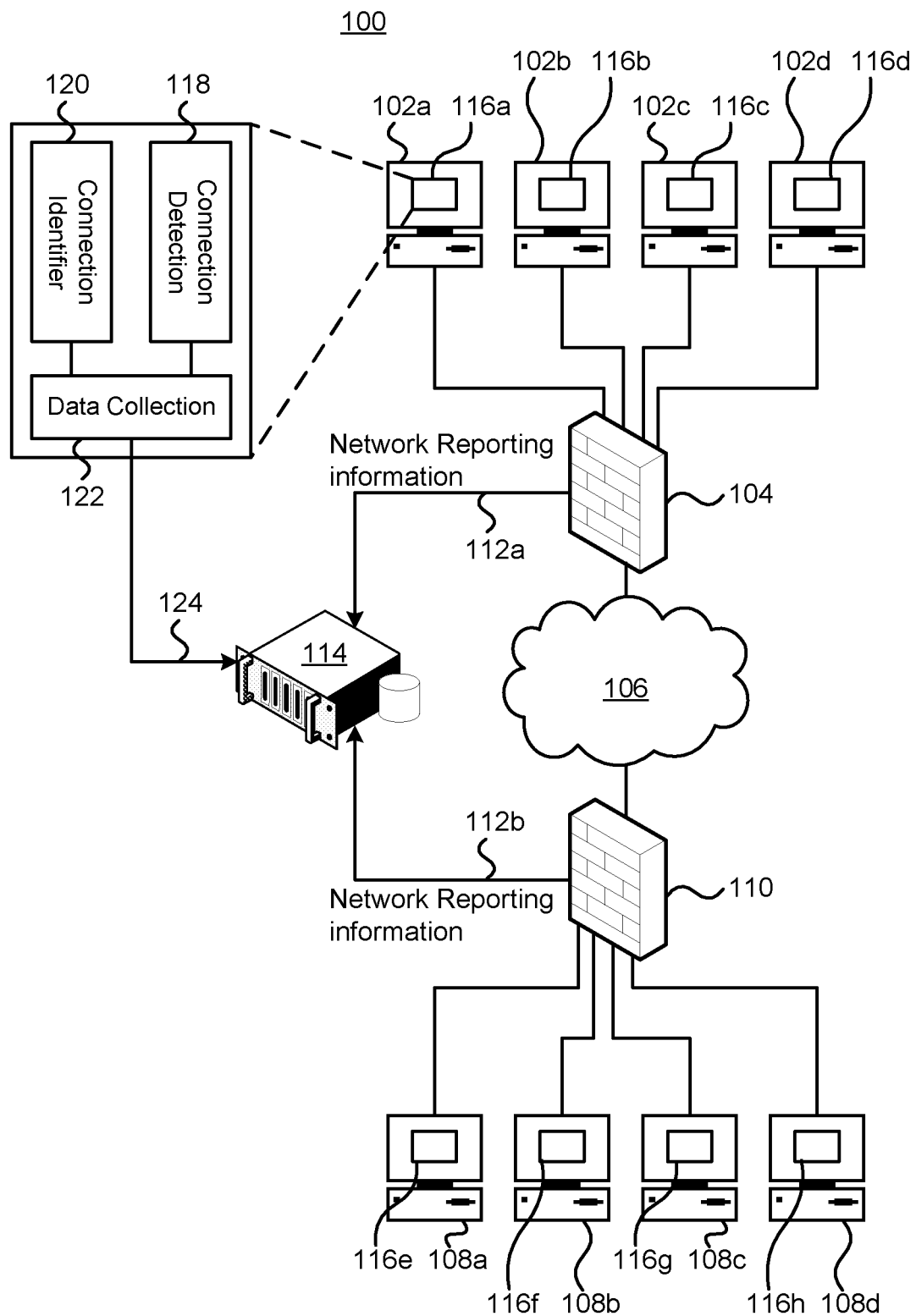
FIG. 1 depicts a system with peer connection monitoring for network applications.

In accordance with the present disclosure, there is provided a method for use in identifying network peer connections comprising identifying by a network computer device, connection details of a new network connection associated with host-specific connection information, the connection details comprising network identifiers of the network computer device and a destination computer device of the new network connection; at the network computer device, arrange the connection details according to a predetermined ordering; at the network computer device, generating a connection identifier from the ordered connection details; and transmitting from the network computer device, the connection identifier and associated host-specific connection information to a server for peer connection monitoring.

In accordance with the present disclosure, there is further provided a system for use in identifying network peer connections comprising: a plurality of network computer devices coupled to a communication network, each configured to: identify connection details of a new network connection associated with host-specific connection information, the connection details comprising network identifiers of the network computer device and a destination computer device of the new network connection; arrange the connection details according to a predetermined ordering; generate a connection identifier from the ordered connection details; and transmit the connection identifier and associated host-specific connection information to a server for peer connection monitoring; the server for peer connection monitoring configured to: receive respective connection identifiers and associated host-specific connection information from the plurality of computer devices; store the received connection identifiers and associated host-specific connection information; and identify host-specific connection information for each host of a desired connection using a common connection identifier for the desired connection.

Computer systems that are either under attack, have been compromised, are under control of an attacker, or are being used by a malicious insider may exhibit abnormal network activity. Most of the time a bad actor must use the network to achieve their goal of acquiring sensitive data. The network is accessed by either using purposely built software tools or system tools that are already built-in to the operating system of the compromised computer. Knowledge of what tools or applications are commonly networking peers, that is what applications commonly communicate with each other over the network, is valuable information in determining normal network activity. The knowledge of normal network activity can be used for the detection of a computer system breach based on abnormal behavior at the application/process level.

When a network accessible computer system is the target of an attack, has already been compromised, or is being used by a malicious insider the network activity related to the intrusion and subsequent lateral movement attempts can be used to detect malicious intent. Many existing intrusion detection systems are based on known attacks and thus look for signatures in applications and/or patterns within network data streams and so have inherent flaws since the attack 'pattern' must be known. In the case of network data streams, there is often encryption involved which prevents the data stream from being inspected. Traditional network threat detection happens at the perimeter of a network which does not help in the case of malicious insiders who already have access. There is a rich set of data that existing solutions either don't, or cannot, consider when evaluating applications or users for a threat. By identifying host specific connection information on both ends of a network connection and associating the host specific connection information at each end with a unique per-connection identifier, it is possible to combine the host-specific connection information from both ends of a connection and so provide a rich set of data that can be used to enhance threat detection. The host specific connection information may include for example, information on the application and/or process associated with the connection, other applications and/or processes running on the host, host identification information, user identification information, login sessions, as well as other information about the connection available at the host. This can provide useful information for solutions that detect threats, possibly through machine learning as it provides application behavior modeling opportunities related to communicating peer applications.

In order to identify applications and uniquely identify network connection peers, monitoring technology is located on each host such that on a per process/application network connection basis a unique connection identifier (CUID) can be generated. The CUIDs for each end of a connection are preferably the same as each other, or at least include similar information that allow the two ends of a single connection to be uniquely associated with each other. An application that makes multiple connections would have a unique CUID for each connection. The connection details including the CUID from all hosts are gathered in a common storage area where each CUID can act as a primary key identifying connection details including the application, user and hosts, as well as various connection meta-data such as byte counts and direction for example. Once consolidated in storage and indexed by the CUID, information on the applications peers amongst the host(s) involved can be used for various purposes such as behavioral analytics. As described further below, it is possible to collect network connection peer information which may be used to identify different hosts, users, applications, etc. that normally communicate with each other. Various behavioral analytics can be applied to the collected network connection peer information. Different behavioral models can be created to identify potentially abnormal behavior, or the collected information may be processed in other ways to identify actual and/or potential threats.

FIG. 1 depicts a system with peer connection monitoring for network applications. The system 100 allows user information, host information, and application/process information for each side of a network connection, i.e. the sender and receiver or source and destination, to be associated with connection details such as the number of bytes sent, NetFlow data, as well as other possible connection data. The system 100 comprises a number of different computer devices 102a-102d (referred to collectively as computer devices 102) that are communicatively coupled together by a network device 104, which is depicted as a firewall, however may include devices such as switches, routers, access points, etc. The network device 104 may couple the computer devices 102 to a network 106 that may be an internal network and/or an external network. Similarly a number of computer devices 108a-108d (referred to collectively as computer devices 108) may be communicatively coupled to the network 106 by a network device 110, which is depicted as a firewall, however may include devices such as switches, routers, access points, etc. The computer devices 102 and computer devices 108 may be located on the same internal network or on separate networks. The network devices 104, 110 may monitor network traffic flowing through the respective devices and provide network reporting information 112a, 112b (referred to collectively as network reporting information 112) to a centralized server or repository 114. Although the network reporting information 112 is useful in analyzing network traffic, it does not provide details on the particular user, application, and/or process that is associated with the traffic and as such it is of limited use in determining normal or abnormal network behavior. For example, it may be normal for a particular user and application on a host to communicate frequently with a particular application on a second host; however, the same user, and application on the first host may not normally communicate with a different application on the second host. As described further below, it is possible to augment network reporting information to allow details about each end-point of a connection to be associated with each other. As described further, each computer device 102, 108 may provide the end-point connection details that are only available at the host, such as user information, login information, and/or application/process information of the connection in association with a connection identifier that allows the end-point connection details of both end-points to be associated with each other. For example, both end-points may associate the respective end-point connection information with a common identifier that is unique to the particular connection. By sending the end-point connection details in association with the unique connection identifier to a central server or repository 114 it is able to associate the detailed connection information for both end-points together. Further, the information may include details, such as source/destination identifiers, that allow the detailed connection information to also be associated with the network reporting information received from the network communication devices 104, 110.

As depicted in FIG. 1, each of the computing devices 102, 108 includes end-point connection monitoring functionality 116a-116h (referred to collectively as connection monitoring functionality 116). Although not depicted in FIG. 1, it will be appreciated that each of the computing devices 102, 108 comprise a processor for executing instructions that are stored in memory communicatively coupled with the processor. The executed instructions configure the computing devices 102, 108 to provide the connection monitoring functionality 116. The connection monitoring 116 includes connection detection functionality 118 that detects, or receives a notification of, a new network connection being established. The connection detection functionality 118 can determine when both an outbound and inbound connection is established. When a new connection is established, a connection identifier is generated that allows both ends of the connection to be associated with each other. The connection identifier may be based on the connection details; however it may be arranged in a particular manner so that both ends of the connection create the same identifier. As an example, the connection identifier could be generated as a hash of the connection details such as the source and destination IP addresses a port. However, if the hash is generated based on an order of, for example source IP address, source port, destination IP address, destination port the two ends of the connection will generate different hashes since the two ends will have different sources and destination identifiers. Accordingly, the connection identifier functionality 120 may arrange connection details in such a manner that both ends of the connection generate the same connection identifier. One possible method is to arrange the network addresses and ports in a numerically increasing manner so that regardless of the source and destination addresses, they will be ordered in the same manner by both ends of the connection. Although described as generating an identical connection identifier, it will be appreciated that the connection identifiers do not need to be strictly identical, but rather need to be able to be associated with each other. For example, one end of the connection could be associated with an identifier of 12345a and the other end of the connection could be associated with an identifier of 12345b. The two identifiers could be associated with each other based on the common portion of the identifier, namely 12345. Other means of associating non-identical identifiers with each other are possible.

Once the connection identifier is generated it can be associated with host-specific connection information by host-specific data collection functionality 122. The host-specific connection information available at the host computer device may include a host identifier, a user identifier, login information associated with the user, applications currently running on the host, an application and/or process associated with the connection as well as other possible information related to the connection such as IPFIX data. The particular host-specific connection information may be information available at the computer device that would be beneficial to associate with the connection. The host-specific connection information and associated connection identifier is transmitted to the central server or repository 114. The central server or repository may store the received information from both ends of the connection. The stored information may then be processed in order to identify normal and/or abnormal network behavior.

Figure 2:
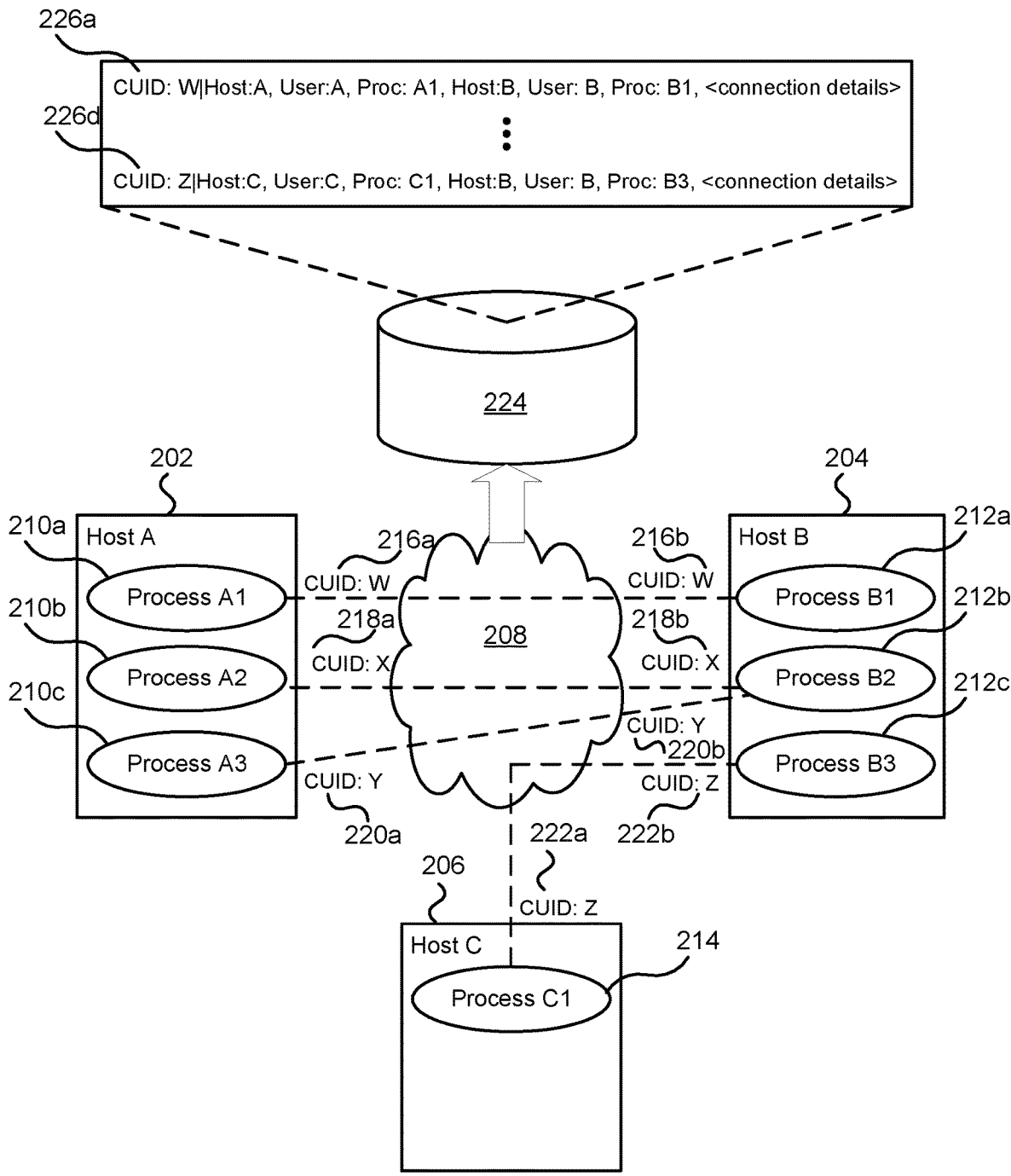
FIG. 2 depicts peer connection monitoring of network applications.

FIG. 2 depicts peer connection monitoring of network applications. As depicted a number of different host computers 202, 204, 206 may communicate with each other over a network 208. Each of the host computers may have a number of different processes running on the host that communicate with other processes on other hosts. As depicted, host A 202 includes three processes 210a-210c, host B 204 has three processes 212a-212b and host C 206 has a single process 214. Process A1 210a is depicted as communicating with process B1 212a; process A2 210b communicates with process B2 212b and process A3 210c communicates with process B2 212b. Process C1 214 on Host C 206 communicates with process B3 212c. As depicted each end of a connection is associated with the same unique connection identifier. For example, both ends 216a, 216b of a first connection are associated with a CUID 'W'; both ends 218a, 218b of a first connection are associated with a CUID 'X'; both ends 220a, 220b of a first connection are associated with a CUID 'Y'; and both ends 222a, 222b of a first connection are associated with a CUID 'Z'. Each of the hosts 202, 204, 206 communicate the CUID of each connection along with the host-specific connection information to a central location, depicted as a database 224. As depicted, the host-specific connection information of both ends of a connection can be joined together, either in the storage or retrieval of the data. For example, records 226a-226d may be associated with each CUID and store the host, user and process information of both ends of the connection as well as connection details, which may include for example, the source and destination IP and port numbers as well as other possible connection details. Further, the connection details may allow the stored host-specific connection information to be associated with network monitoring data such as NETFLOW of IPFIX data received from other network devices.

Figure 3:
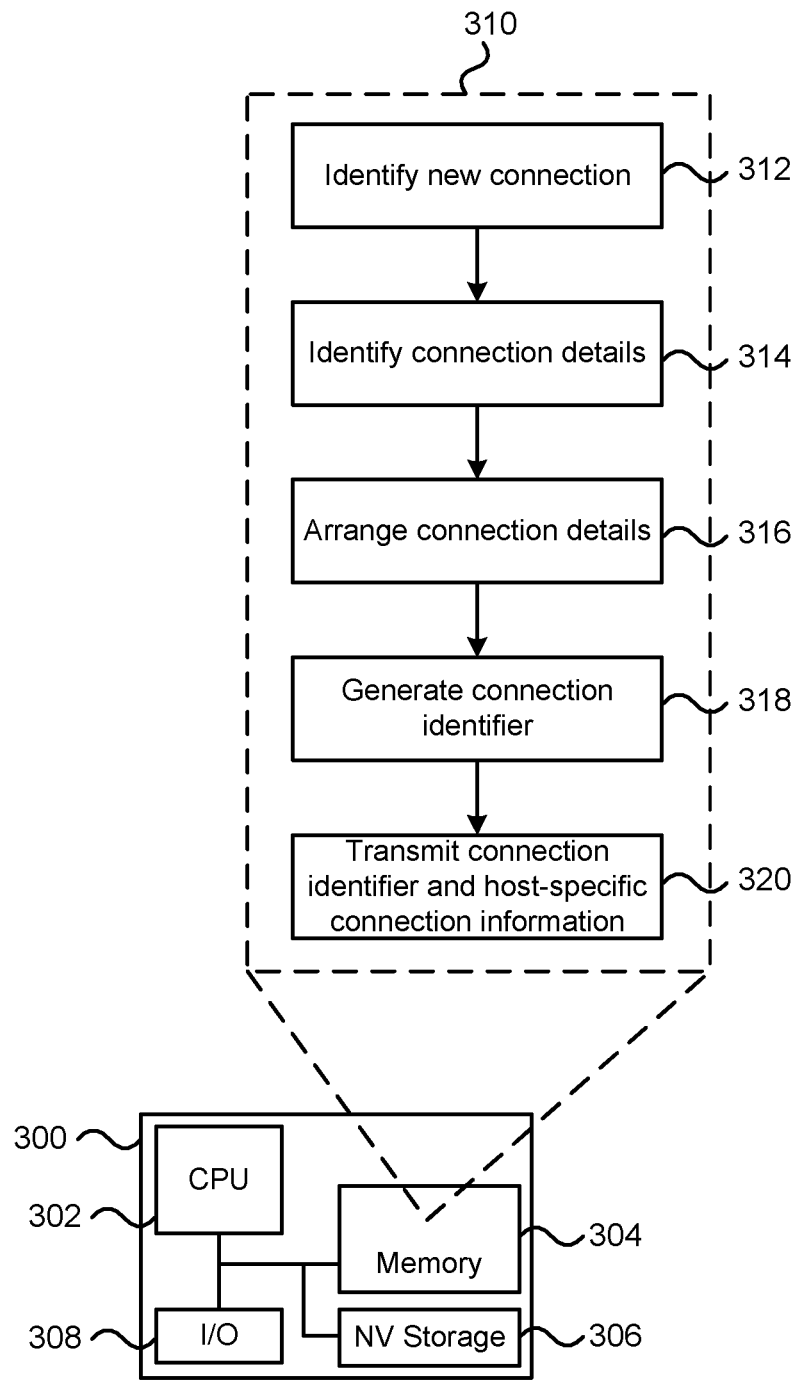
FIG. 3 depicts a method for peer connection monitoring.

FIG. 3 depicts a computer device implementing functionality for peer connection monitoring. The computer device 300 may be used as one of the computing devices 102, 108 described above. The computer device 300 comprises a processing unit 302 that is capable of executing instructions that can be stored in memory 304. The computer device 300 may further comprise non-volatile store 306 for long term storage of instructions and data as well as one or more input/output (I/O) interfaces 308, which may include for example network interfaces or interfaces for connecting peripherals. The instructions stored in the memory 304, when executed by the processor 302, configure the computer device 300 to provide the peer connection monitoring functionality 310.

The peer connection monitoring functionality 310 may implement a method that includes identifying a new connection (312) and identifying connection details (314) of the new connection. The connection details may include, for example source and destination IP addresses, ports as well as protocol information. The connection details are arranged (316) in a manner that the connection details will be ordered in the same way at both ends of the connections. Using the ordered connection details, a connection identifier is generated (318) that can be associated with host-specific connection information. The host-specific connection information is information available at the end-point that may be useful to associate with the connection in order to identify potential normal vs. abnormal behavior. The host-specific connection information may include, for example host information, user information, application information and/or process information. The host-specific connection information and associated connection identifier can then be transmitted (320) to a central location for association, through the matching connection identifier, with the host-specific connection information from the other end of the connection.

Table 1 below depicts illustrative host specific connection information and the connection identifier for a first side, namely the client side, of a connection. Table 2 below depicts illustrative host specific connection information and the connection identifier for a second side, namely the server side, of the same connection.

TABLE 1

Client side host specific connection information and connection identifier

| | |
|---|---|
| event.category | network |
| event.code | Record |
| event.contactIp | 10.10.11.64 |
| event.eventUuid | 15F97E4AEAB-6034-2709-0479-00000000789F |
| event.machineName | KRUSTY |
| event.sensorVersion | 5.5.0.29704 |
| event.servertimestamp | November 7th 2017, 14:11:04.000 |
| event.sourceIp | 10.10.11.64 |
| event.timestamp | November 7th 2017, 14:11:07.435 |
| header.processInstanceId | 1510081863978-13912 |
| header.sessionId | 1508932664153-2 |
| header.userAccount | AD.EXAMPLE\rchittaro |
| header.userId | S-1-5-21-1459600783-354982826-1972692496-1145 |
| header.userLogin | rchittaro@example.com |
| header.userType | domain |
| network.applicationName | curl.exe |
| network.applicationPath | C:\cygwin64\bin\curl.exe |
| network.-connectionInstanceId | 6BF06E2236AA3DA5910DDADBBBBF5177 |
| network.-directionInbound | false |
| network.durationMs | 3,453 |
| network.localIPAddr | 10.10.11.64 |
| network.localPort | 58,166 |
| network.packetsIn | 1 |
| network.packetsOut | 2 |
| network.processId | 13,912 |
| network.protocol | TCP |
| network.protocolId | 6 |
| network.remoteIPAddr | 10.10.11.111 |
| network.remotePort | 4,444 |
| network.transportBytesIn | 0 |
| network.-transportBytesOut | 81 |

TABLE 2

Client side host specific connection information and connection identifier

| | |
|---|---|
| event.category | network |
| event.code | Record |
| event.contactIp | 10.10.11.111 |

TABLE 2-continued

Client side host specific connection information and connection identifier

| | |
|---|---|
| event.eventUuid | 15F97E49E82-FFFFEE4F-37BA-0479-000000000007 |
| event.machineName | RON-WIN7-VM |
| event.sensorVersion | 5.5.0.29779 |
| event.servertimestamp | November 7th 2017, 14:11:06.000 |
| event.sourceIp | 10.10.11.111 |
| event.timestamp | November 7th 2017, 14:11:03.298 |
| header.processInstanceId | 1510081800760-1680 |
| header.sessionId | 1510081621898-1 |
| header.userAccount | AD.INTERSET\rchittaro |
| header.userId | S-1-5-21-1459600783-354982826-1972692496-1145 |
| header.userLogin | rchittaro@ad.interset.com |
| header.userType | domain |
| network.applicationName | ncat.exe |
| network.applicationPath | C:\tools\nmap-7.50\ncat.exe |
| network.connectionInstanceId | 6BF06E2236AA3DA5910DDADBBBBF5177 |
| network.directionInbound | true |
| network.durationMs | 3,445 |
| network.localIPAddr | 10.10.11.111 |
| network.localPort | 4,444 |
| network.packetsIn | 2 |
| network.packetsOut | 1 |
| network.processId | 1,680 |
| network.protocol | TCP |
| network.protocolId | 6 |
| network.remoteIPAddr | 10.10.11.64 |
| network.remotePort | 58,166 |
| network.transportBytesIn | 81 |
| network.transportBytesOut | 0 |
| timestamp | November 7th 2017, 14:11:03.298 |

In the tables above, network.connectionInstanceId provides that connection identifier. As depicted, both the client and server side have the same value of "6BF06E2236AA3DA5910DDADBBBBF5177". Accordingly, when the above information is received at a server, the information from each end of a connection can be joined together, or at least associated with each other, using the common connection identifier. The host specific connection information in the above tables includes event.category; event.code; event.contactIp; event.eventUuid; event.machineName; event.sensorVersion; event.servertimestamp; event.sourceIp; event.timestamp; header.processInstanceId; header.sessionId; header.userAccount; header.userId; header.userLogin; header.userType; network.applicationName; and network.applicationPath. The Tables also include connection details such as: network.directionInbound; network.durationMs; network.localIPAddr; network.localPort; network.packetsIn; network.packetsOut; network.processId; network.protocol; network.protocolId; network.remoteIPAddr; network.remotePort; network.transportBytesIn; network.transportBytesOut; and timestamp.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

What is claimed is:

1. A method for use in identifying network peer connections comprising:
    receiving notification of a new network connection being established;
    in response to the notification, identifying by a network computer device associated with the new network connection, connection details of the new network connection comprising network identifiers of end points of the new network connection, wherein the network computer device is associated with an end point of the end points;
    at the network computer device, ordering the connection details according to a predetermined ordering;
    at the network computer device, generating, on a per-application network connection basis, a unique connection identifier from the ordered connection details, wherein at least one of user information and application information is incorporated in the unique connection identifier, and wherein different unique connection identifiers are generated for each connection that the network computer device makes using a network application; and
    transmitting from the network computer device, the unique connection identifier and host-specific connection information associated with the new network connection to a server for peer connection monitoring and detection of abnormal behavior for at least one of users and network applications, wherein abnormal behavior of a user is detected based on the user information incorporated in the unique connection identifier, wherein abnormal behavior of the network application is detected based on the application information incorporated in the unique connection identifier, and wherein the unique connection identifier is identical among the end points of the new network connection.

2. The method of claim 1, wherein the new network connection is a new inbound connection or a new outbound connection.

3. The method of claim 1, wherein the connection details comprise a source Internet Protocol (IP) address and port number and a destination IP address and port number.

4. The method of claim 3, wherein the predetermined ordering orders the connection details numerically.

5. The method of claim 1, wherein the host-specific connection information comprises one or more of:
    a host identifier;
    a user identifier;
    login information;
    applications currently running on the network computer device;
    an application associated with the new network connection;
    a process associated with the new network connection; and
    Internet Protocol Flow Information Export (IPFIX) data.

6. The method of claim 1, further comprising:
    receiving, at the server for peer connection monitoring from the network computer device, the unique connection identifier and host-specific connection information;
    receiving at the server for peer connection monitoring the unique connection identifier and second host-specific connection information from a second network computer device associated with the new network connection; and storing the received host-specific connection information and the second host-specific connection information in association with the unique connection identifier.

7. The method of claim 6, further comprising receiving, at the server, additional host-specific connection information associated with respective additional unique connection identifiers for each end point of a plurality of additional network connections.

8. The method of claim 7, further comprising processing the stored received host-specific connection information in association with connection information for the plurality of additional network connections to identify normal network connection peer behavior.

9. A network computer device comprising:
   a processing unit capable of executing instructions; and
   a memory storing instructions, which when executed by the processing unit, configure the network computer device to:
      identify connection details of a new network connection comprising network identifiers of end points of the new network connection, wherein the network computer device is associated with an end point of the end points;
      arrange the connection details according to a predetermined ordering;
      generate, on a per-application network connection basis, a unique connection identifier from the arranged connection details, wherein at least one of user information and application information is incorporated in the unique connection identifier, and wherein different unique connection identifiers are generated for each connection that the network computer device makes using a network application; and
      transmit from the network computer device, the unique connection identifier and host-specific connection information associated with the new network connection to a server for peer connection monitoring and for detection of abnormal behavior for at least one of users and network applications, wherein abnormal behavior of a user is detected based on the user information incorporated in the unique connection identifier, wherein abnormal behavior of the network application is detected based on the application information incorporated in the unique connection identifier, and wherein the unique connection identifier is identical among the end points of the new network connection.

10. The network computer device of claim 9, wherein the new network connection is a new inbound connection or a new outbound connection.

11. The network computer device of claim 9, wherein the connection details comprise a source Internet Protocol (IP) address and port number and a destination IP address and port number.

12. The network computer device of claim 11, wherein the predetermined ordering orders the connection details numerically.

13. The network computer device of claim 9, wherein the host-specific connection information comprises one or more of:
   a host identifier;
   a user identifier;
   login information;
   applications currently running on the network computer device;
   an application associated with the new network connection;
   a process associated with the new network connection; and
   Internet Protocol Flow Information Export (IPFIX) data.

14. A system for use in identifying network peer connections comprising:
   a plurality of network computer devices coupled to a communication network, each network computer device comprising:
      a processing unit capable of executing instructions; and
      a memory storing instructions, which when executed by the processing unit of the network computer device, configure the network computer device to:
         identify connection details of a new network connection comprising network identifiers of end points of the new network connection, wherein the network computer device is associated with an end point of the end points;
         arrange the connection details according to a predetermined ordering;
         generate, on a per-application network connection basis, a unique connection identifier from the arranged connection details, wherein at least one of user information and application information is incorporated in the unique connection identifier, and wherein different unique connection identifiers are generated for each connection that the network computer device makes using a network application; and
         transmit from the network computer device, the unique connection identifier and host-specific connection information associated with the new network connection to a server for peer connection monitoring and for detection of abnormal behavior for at least one of user and network applications, wherein abnormal behavior of a user is detected based on the user information incorporated in the unique connection identifier, and wherein abnormal behavior of the network application is detected based on the application information incorporated in the unique connection identifier;
   the server for peer connection monitoring comprising:
      a processing unit capable of executing instructions; and
      a memory storing instructions, which when executed by the processing unit of the server, configure the server to:
         receive respective connection identifiers and associated host-specific connection information from the plurality of network computer devices, wherein receiving the respective connection identifiers comprises receiving the unique connection identifier from at least the network computer device, and wherein the unique connection identifier is identical among the end points of the new network connection; and
         store the received respective connection identifiers and associated host-specific connection information.

15. The system of claim 14, wherein the instructions stored in the memory of the server comprise instructions which when executed by the processing unit of the server further configure the server to receive additional host-specific connection information associated with respective additional connection identifiers for each end point of a plurality of additional network connections.

16. The system of claim 15, wherein the instructions stored in the memory of the server comprise instructions which when executed by the processing unit of the server further configure the server to process the stored received associated host-specific connection information stored in association with connection information for the plurality of additional network connections to identify normal network connection peer behavior.

17. The system of claim 14, wherein the host-specific connection information comprises one or more of:
   a host identifier;
   a user identifier;
   login information;
   applications currently running on the network computer device;
   an application associated with the new network connection;
   a process associated with the new network connection; and
   Internet Protocol Flow Information Export (IPFIX) data.

18. The system of claim 14, wherein the instructions stored in the memory of the network computer device comprise instructions which when executed by the processing unit of the network computer device further configure the network computer device to generate a hash with the host-specific connection information and provide the hash to the server, wherein:
   the hash is generated from the arranged connection details such that the hash matches another hash generated at a second end point of the end points; and
   the second end point is an opposite end of the new network connection compared to the end point.

19. The system of claim 18, wherein the instructions stored in the memory of the server comprise instructions which when executed by the processing unit of the server further configure the server to compare the hash with a plurality of other hashes for purposes of matching the hash with the another hash generated at the second end point.

20. The method of claim 1, wherein the host-specific connection information comprises an ordered listing of at least two of the following: an event category, an event code, an IP address, a timestamp, a process instance ID, a user ID, a user type, an application name, and an application path.

* * * * *